(12) United States Patent
Thiebaut

(10) Patent No.: US 6,939,072 B2
(45) Date of Patent: Sep. 6, 2005

(54) APPLICATOR ATTACHMENT

(75) Inventor: Laure Thiebaut, Clichy (FR)

(73) Assignee: L'Oreal (FR)

( * ) Notice: Subject to any disclaimer, the term of this patent is extended or adjusted under 35 U.S.C. 154(b) by 0 days.

(21) Appl. No.: 10/465,401

(22) Filed: Jun. 19, 2003

(65) Prior Publication Data

US 2004/0042840 A1 Mar. 4, 2004

Related U.S. Application Data

(60) Provisional application No. 60/392,052, filed on Jun. 28, 2002.

(30) Foreign Application Priority Data

Jun. 20, 2002 (FR) .............................. 02 07641

(51) Int. Cl.$^7$ .............................................. B05C 11/00
(52) U.S. Cl. ...................................... 401/266; 401/262
(58) Field of Search ................................. 401/262, 265, 401/266

(56) References Cited

U.S. PATENT DOCUMENTS 4,002,182 A * 1/1977 Michel ....................... 401/263
5,772,347 A * 6/1998 Gueret ....................... 401/263

FOREIGN PATENT DOCUMENTS

| EP | 0 849 186 A1 | 6/1998 |
| FR | 826.175 A1 | 3/1938 |
| FR | 2 534 885 A1 | 4/1984 |
| FR | 2 635 086 A1 | 2/1990 |
| WO | WO-01/26824 A1 | 4/2001 |

* cited by examiner

Primary Examiner—Gregory L. Huson
Assistant Examiner—Peter deVore
(74) Attorney, Agent, or Firm—Lerner, David, Littenberg, Krumholz & Mentlik, LLP

(57) ABSTRACT

The present invention relates to a product applicator attachment (10) intended to be mounted on a container (20) containing the product that is to be applied, said attachment comprising:

fixing means (17) intended to fix the attachment onto the container;

an applicator portion (12, 13, 14, 15, 16) comprising a distribution chamber (14) delimiting, at least in part, an applicator surface (12), and able to communicate with the inside of the container (20) via an inlet passage (16) of axis X, said chamber (14) also being equipped with at least one product outlet orifice (13) opening onto the applicator surface (12), and of an axis distinct from the axis of the inlet passage (16).

26 Claims, 4 Drawing Sheets

APPLICATOR ATTACHMENT

The present invention relates to an attachment for applying a product in the form of a cream or paste, having a rigid dome-shaped applicator surface used as an element for applying the product to the surface that is to receive the product.

More specifically, the present invention relates to a paste, cream or gel applicator attachment, particularly to an applicator attachment intended for applying, topically, to the skin of a user, a product that has a cosmetic or dermopharmaceutical product, such as a deodorant, scented, slimming or depilatory cream, a face cream, or a gel for treating the scalp.

In the particular case of deodorants or antiperspirants, there are different types of devices for applying the product. The product may, for example, be applied by means of a solid stick containing the ingredient that is to be applied to the user's skin. The product may also be applied using devices of the aerosol type which dispense the product in the form of a spray, or as another alternative through a dispensing dome made of a rigid porous material acting as an applicator element. There are also roller-ball devices in which the ball is mounted so that it can rotate on the top of a container containing the product so that it is, on the one hand, partly in contact with the product within the container and serves, on the other hand, as an applicator surface. Finally, there are applicators formed of a tube with deformable walls ending in an applicator dome equipped with product outlet orifices. Such applicators are, for example, described in Patent Applications EP-A-0 849 186, FR-A-2 534 885 or FR-A-2 635 086.

In particular, Patent Applications EP-A-0 849 186, and FR-A-2 534 885 describe a tube with compressible walls, to one end of which is welded a dome-shaped head which forms an applicator surface. The dome has one or more dispensing orifices passing through it and opening onto the applicator surface. Such tube heads have a shape allowing them to be released from the mould, because the orifices stretch over an area smaller than the smallest cross-sectional area of the dome. They can therefore be produced from a single piece, for example, by a moulding or compression method.

However, to manufacture the tubes which have just been described, it is necessary to modify the equipment used for manufacturing conventional headed tubes to suit the manufacture of a tube equipped with a dome-shaped head, something which is not very profitable from an economic standpoint. Indeed it is more economically viable to use conventional headed tubes and attach an applicator dome to them.

This is why Patent Application FR-A-2 635 086 describes a tube with compressible walls onto which there is welded, not a head in the shape of an applicator dome, but a conventional head equipped with a threaded neck onto which an applicator is fixed. In one of the embodiments described, the applicator is formed of an external wall partly delimiting a domed applicator surface. The applicator surface has a product outlet orifice passing through it, this orifice being in communication with the inside of the tube. The applicator further comprises a fixing skirt threaded on its internal wall so that it can be screwed onto the neck of the tube. Finally, the applicator comprises a skirt which comes into abutment against the head of the tube and allows the product to be guided from the tube to the orifice. With such an applicator, the dispensing orifice has to open into the guide skirt in order to be able to communicate with the inside of the container. The region of the applicator surface in which the product outlet orifice can be formed is therefore limited, because it corresponds to the cross section of the guide skirt.

Another source, Patent FR 826 175, describes a dispensing container comprising a dispensing cap which comprises a distribution chamber. The distribution chamber is formed of several parts bonded or crimped together, and this does not make for a very well sealed distribution chamber.

Hence, one of the objects of the invention is to produce an applicator attachment that can be mounted on a tube of conventional shape containing the product.

Another object of the invention is to produce an applicator attachment that is simple to produce and inexpensive.

Yet another object of the invention is to produce an applicator attachment that comprises an applicator surface over the entirety of which the product can easily be spread.

It is a particular object of the invention to produce an applicator attachment that, in a single pass, allows correct application of the product onto the surface onto which the product is to be deposited.

According to the invention, these objects are achieved by producing a product applicator attachment intended to be mounted on a container containing the product that is to be applied, the attachment comprising:
  fixing means intended to fix the attachment onto the container;
  an applicator portion comprising a distribution chamber delimiting, at least in part, an applicator surface, and able to communicate with the inside of the container via an inlet passage of axis X, the chamber also being equipped with at least one product outlet orifice opening onto the applicator surface, and of an axis distinct from the axis of the inlet passage, the applicator portion being obtained by moulding from a single piece.

Thus, the attachment according to the invention allows the product to be led from the container through a passage of relatively small cross section, particularly one limited to the cross section of the neck of the container, and spread out easily over a relatively large applicator surface. In particular, the presence of the distribution chamber makes it possible to increase the region of the applicator surface into which the outlet orifice can open, so that use can be made of several outlet orifices spaced apart on the applicator surface. The position of the outlet orifices therefore does not depend on the configuration of the passage guiding the product into the attachment from the container. Such an attachment can therefore be mounted on a conventional headed tube equipped with a threaded neck. Furthermore, the attachment can be easily produced.

The applicator surface is preferably domed so as to conform to the surface to which it is intended to be applied, particularly the armpits.

The fixing means of the attachment consist of a cylindrical fixing skirt intended to be fixed onto the container. The fixing skirt particularly comprises a screw thread on its interior wall, the screw thread being intended to collaborate with a screw thread provided on the exterior wall of the container, particularly on a neck formed at one end of the container.

The product inlet passage into the chamber is advantageously surrounded by a sealing skirt intended to fit into an opening of the container, particularly into the neck of the container.

The attachment is of longitudinal axis X and its cross section is of roughly oval shape. Thus, the shape of the attachment is suited to the armpits and allows application in a single pass, unlike an attachment of circular cross section which requires several passes in order to fully cover the entirety of the armpit.

The attachment advantageously comprises at least two outlet orifices so that the product spreads out more easily over the entirety of the applicator surface. In particular, the product outlet orifices are formed along the major axis of the oval cross section of the applicator surface.

The attachment may be obtained by moulding a thermoplastic from a single piece. In particular, the thermoplastic is chosen from polypropylenes, polyethylenes, polyethylene phthalates or polystyrenes.

Another object of the invention is a method for producing an applicator attachment as has just been described and which comprises the following steps:
 assembling a mould to delimit a cavity;
 injecting a quantity of thermoplastic into the cavity in order to fill it;
 moving at least one moving part of the mould in order to increase the volume of the cavity;
 injecting a gas into the cavity so that the thermoplastic spreads out in the increased volume of the cavity and so that an internal void is formed within the injected material, so as to form the distribution chamber;
 releasing from the mould.

According to one particular embodiment, the gas is injected via an injection head positioned in the mould in such a way that demoulding of the injection head forms the outlet orifice. According to this embodiment, the moving part of the mould is intended to delimit, in part, the wall of the distribution chamber away from the applicator surface.

According to another embodiment, the gas is injected via an injection head positioned in the mould in such a way that demoulding of the injection head forms the inlet passage into the distribution chamber. According to this embodiment, the moving part is intended to delimit, in part, the wall of the distribution chamber corresponding to the applicator surface.

A further subject of the invention is an entity for packaging and applying a product, and which comprises:
 a container with compressible walls containing the product that is to be applied;
 an applicator attachment as described above, mounted on the container.

The container may be a tube ending in an open neck onto which the applicator attachment is fixed.

The packaging and applicator entity may also comprise a closure cap intended to close the product outlet orifice(s). The cap advantageously has a wall of a shape roughly complementing the exterior surface of the attachment over which it is intended to sit. The wall is advantageously provided with at least one pip designed to fit into the outlet orifice so as to seal it in a roughly product-tight manner.

The invention is particularly useful for packaging a cosmetic or care product, particularly a deodorant.

The invention consists, apart from the provisions set out hereinabove, in a certain number of other provisions which will be explained hereinafter, with regard to some non-limiting exemplary embodiments that are described with reference to the attached figures among which:

Figure 1:
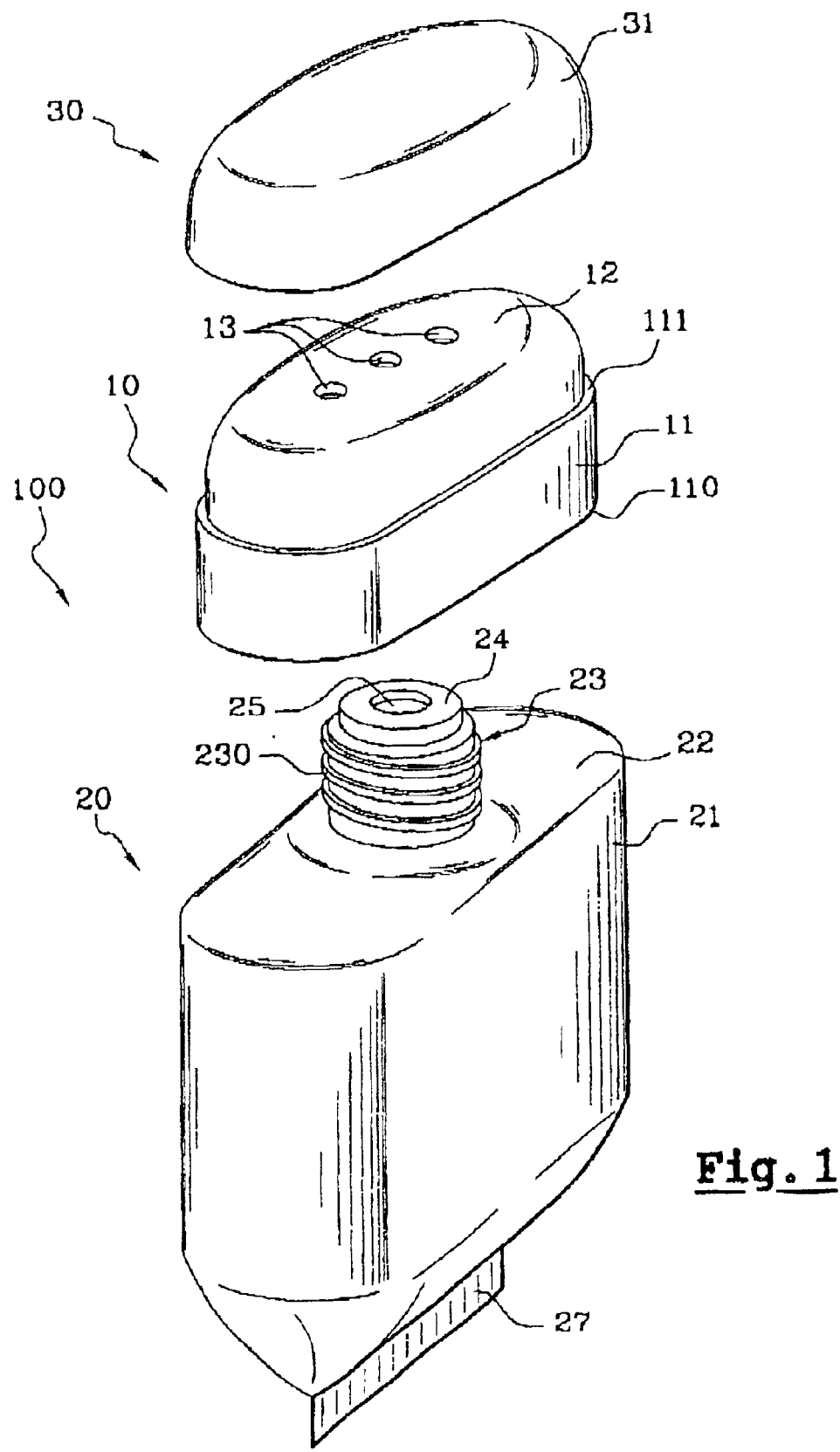
FIG. 1 illustrates an exploded view of one embodiment of a packaging and applicator entity according to the invention.
Figure 2:
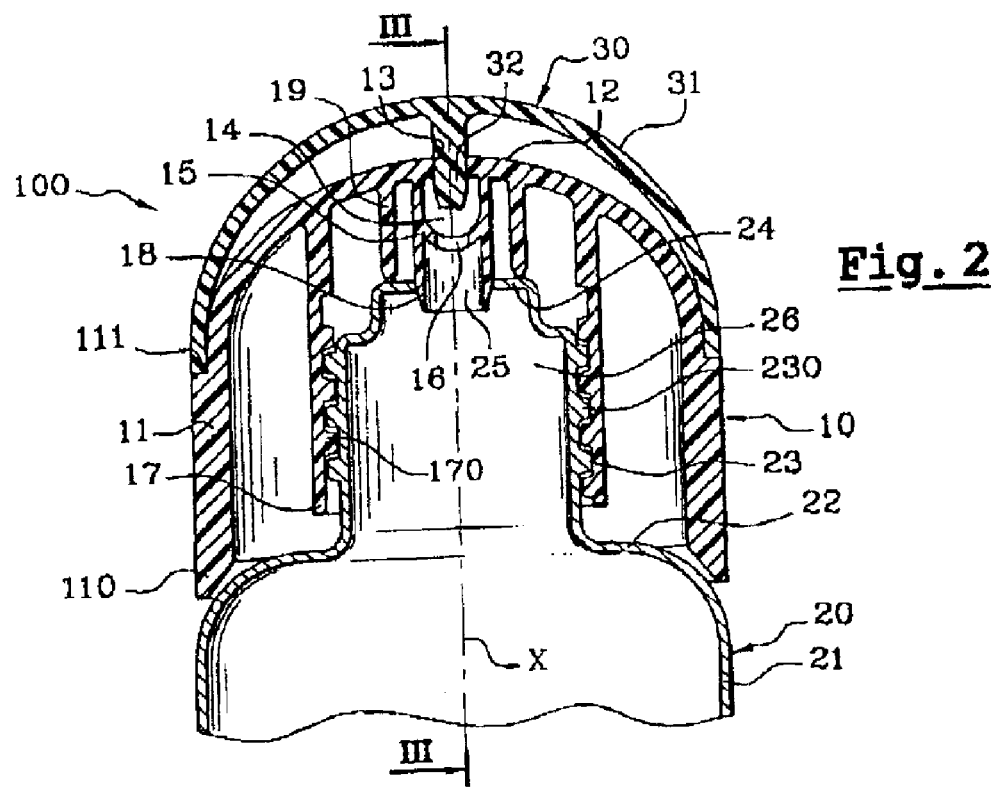
FIG. 2 depicts a partial axial section of the entity illustrated in FIG. 1.
Figure 3:
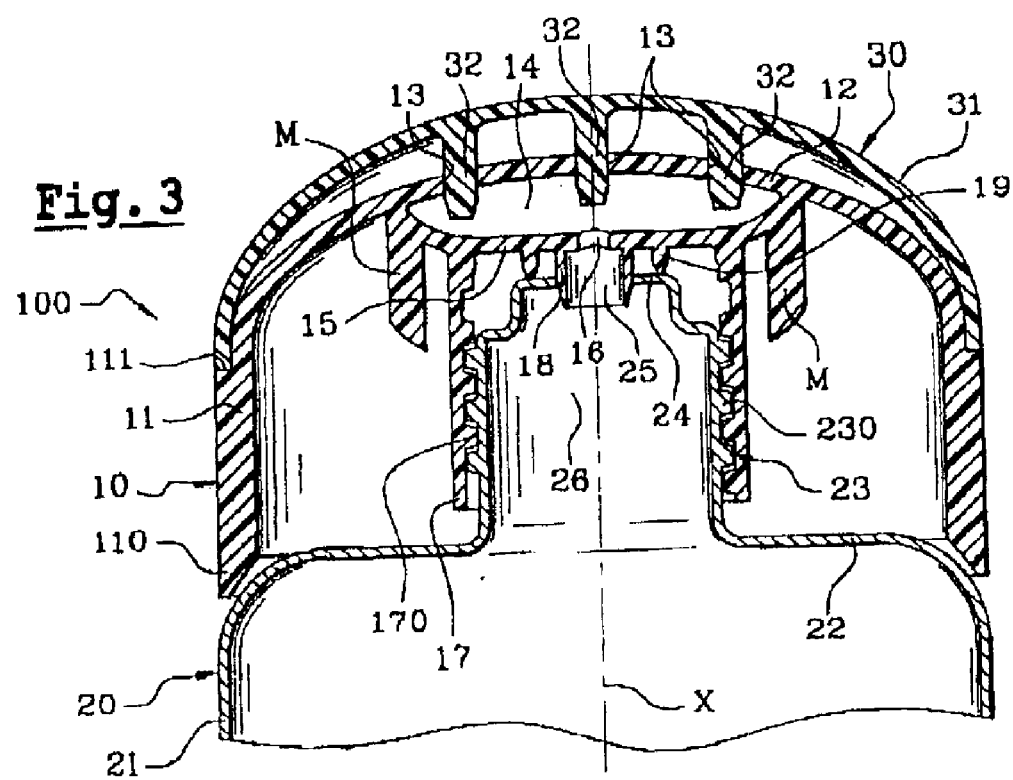
FIG. 3 depicts a partial axial section of the entity depicted in FIG. 2, on III—III.

FIGS. 1 to 3 depict a packaging and applicator entity 100 comprising a container 20 in the form of a tube surmounted by an applicator attachment 10 closed by a removable cap 30. The tube 20 contains a product in the form of a cream or paste intended to be applied to a surface that is to be treated. This is, for example, a deodorant intended to be applied to the armpits.

The tube 20 comprises a body 21 of axis X, roughly cylindrical in its upper portion and of roughly oval cross section. In FIG. 2, the body 21 is shown along the major axis of the oval cross section, where as in FIG. 3, it is depicted along the minor axis.

The body 21 is formed from a cylindrical skirt, to the upper end of which is welded a head consisting of a shoulder 22 surmounted by a neck 23. The neck 23 is provided with an external screw thread 230 able to collaborate with a complementary screw thread 170 of the applicator attachment. The neck ends in a transverse wall 24, at the middle of which is formed an opening 25. The neck has a central dispensing duct 26 passing through it and which duct opens through the opening 25. The lower end of the skirt forming the body 21 of the tube situated away from the neck 23, is pinched together and heat sealed to obtain a straight end 27.

The tube 20 is flexible, that is to say compressible in the region of the body 21, while the head formed by the shoulder and the neck is more or less rigid due to a greater thickness of material than in the body 21. The difference in rigidity between the body and the head may also be the result of the choice of the kind of material, when a complex tube is being made in two different materials. As a preference, the tube is made of polyethylene or some other similar thermoplastic. More conventionally, it may be made of aluminium or tin. In the latter case, the straight end 27 is obtained by folding. The body 21, as appropriate, may be made as a multilayer structure, for example plastic/metal/plastic.

The tube 20 is surmounted by an applicator attachment 10 of axis X. The applicator attachment 10 according to the invention comprises an outer side wall 11, stretching axially, open in its lower part 110. The side wall 11 meets itself at its upper part in the form of a domed transverse wall. This transverse wall constitutes the applicator surface 12. The cross section of the side wall 11 is of roughly oval shape and corresponds roughly to that of the upper part of the tube, which means that when the attachment is mounted on the tube, the side wall 11 runs roughly in the continuation of the wall of the tube 20. The outer side wall 11 has a cutout 111 which, as will be seen in detail later, allows the positioning of the cap 30.

Three product outlet orifices 13 open onto the applicator surface 12. They are advantageously aligned along the major axis of the oval cross section of the attachment so as to be spread well over the applicator surface. Inside the attachment, the orifices 13 open into a distribution chamber 14 formed, on the one hand, by part of the domed transverse wall that constitutes the applicator surface 12 and, on the other hand, by an interior transverse wall 15, concave toward the applicator surface. The chamber 14 is of elongate shape and also extends along the major axis of the oval cross section of the attachment. The interior transverse wall 15 delimiting the chamber has passing through it a passage 16 formed along the axis X of the attachment, that allows product from the tube 20 to enter the distribution chamber. According to this embodiment, two of the three orifices 13 are formed along an axis other than the axis X of the passage 16 and the central orifice is of axis X.

The attachment 10 also comprises a fixing skirt 17 that allows the attachment to be fixed onto the tube 20. The fixing skirt is a skirt that is cylindrical of revolution and runs partly from the domed exterior transverse wall 12 and partly from the interior transverse wall 15 around the passage 16. The fixing skirt 17 comprises a screw thread 170 on its internal wall which screw thread is intended to collaborate with the screw thread 230 of the neck 23 of the tube so as to allow the attachment to be screwed onto the tube.

The attachment is also equipped with a sealing skirt 18, of axis X, formed around the passage 16, inside the fixing skirt 17. The sealing skirt 18 is designed to be inserted into the opening 25 of the tube and has a diameter slightly smaller than that of the opening so as to come into contact with the edge of the tube delimiting the opening 25. Thus, practically all the product arriving from the tube is conveyed into the distribution chamber. In this way it is possible to avoid product running into the screw thread of the fixing skirt. A second skirt 19 is provided around the first, to butt against the transverse wall surrounding the opening of the neck.

As will be seen in detail later, the attachment is obtained by moulding from just one piece, for example in a polypropylene.

A closure cap 30 is designed to close the product outlet orifices 13 when the entity is in the storage position. The cap 30 comprises a wall 31 of a shape that roughly complements the domed transverse wall 12 over which it sits when the cap is mounted on the attachment. In this position, the cap butts against the cut-out 111 formed in the side wall 11 of the attachment, and grips the attachment at this point. Three pips 32 extend axially from the inside of the wall 31. These pips are configured and positioned in such a way that each fits into an outlet orifice 13 to close it in a more or less product-tight way.

Figure 4A:
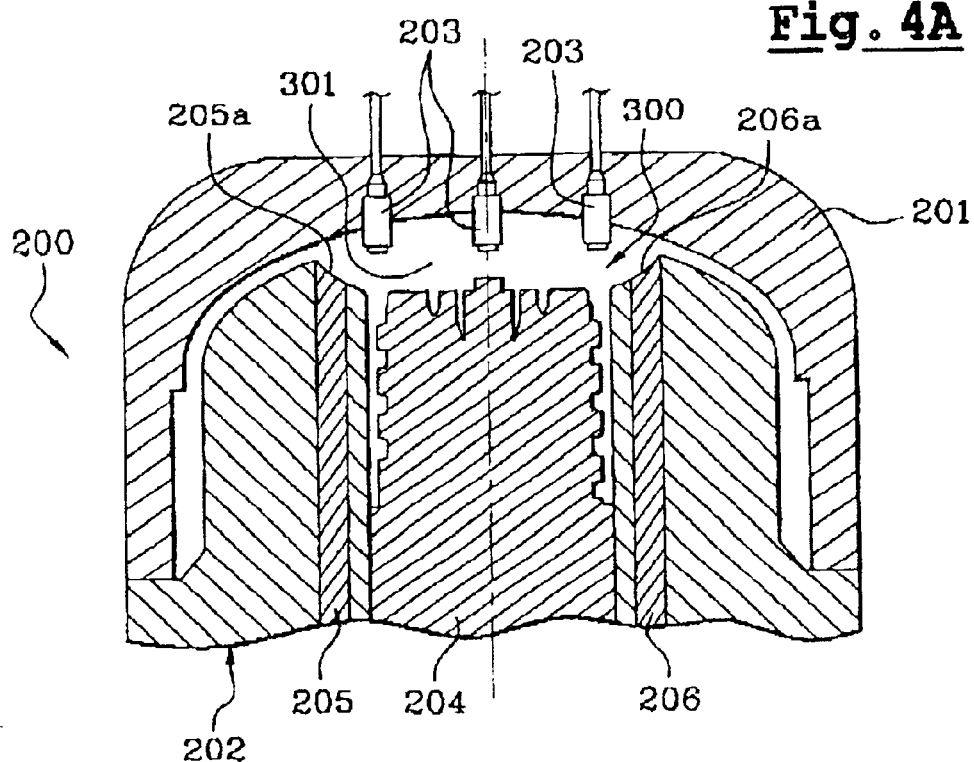
FIGS. 4A–4C depict the steps of a first embodiment of a method for producing the applicator attachment according to the invention.
Figure 4B:
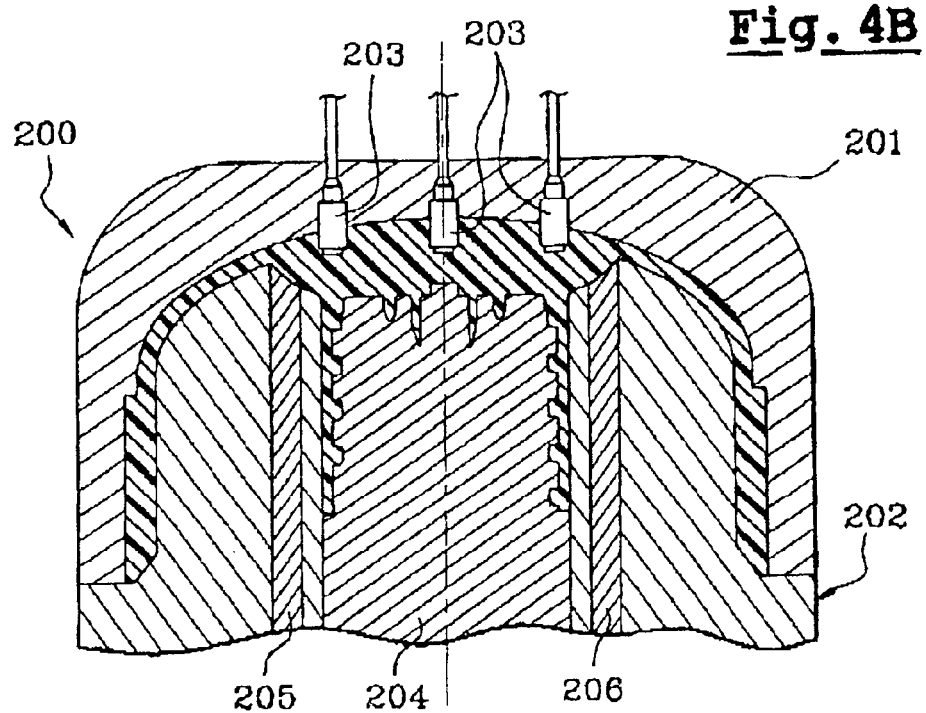
Figure 4C:
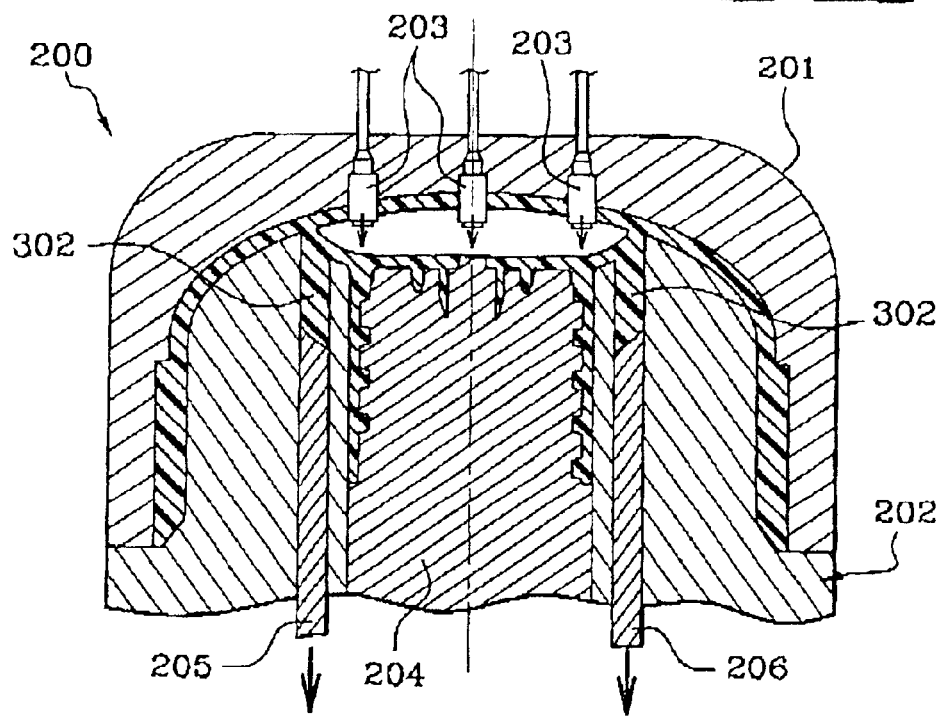

In order to produce the attachment according to a preferred embodiment of the invention, use is made of the gas-enhanced injection moulding technique using thermoplastic. The steps of the manufacturing method are depicted in FIGS. 4A to 4C.

The mould 200 used comprises a hollow part 201 intended to delimit the external surface of the attachment and a core 202 intended to delimit the internal surface of the attachment. The hollow part 201 and the core 202 are inserted one inside the other and able to move one relative to the other in an axial movement to allow release from the mould. In the assembled position, as has been depicted in FIG. 4A, the mould delimits a cavity 300 which corresponds roughly to the shape of the attachment, except that there is no mould portion provided for delimiting the internal wall of the distribution chamber 14. In this region, a simple void 301 is provided and delimited in part by the core and by the hollow part. The hollow part 201 is equipped with three gas injection heads 203 which open into the cavity 300, and more particularly into the void 301. The core 202 comprises a central portion 204 able to move with respect to the main core 202 and designed to delimit the threaded fixing skirt 17. The central portion 204 also partly delimits the external surface of the internal transverse wall 15 delimiting the chamber 14. Inside the main core 202 there are two sliding pieces 205 and 206, each end 205a and 206a of which partially delimits the void 301 intended to form the distribution chamber.

Once the mould has been assembled, the thermoplastic is injected into the cavity 300 by an injection head, not depicted. The cavity 300, and in particular the void 301, is entirely filled with material, as can be seen in FIG. 4B.

Before the thermoplastic has fully cooled, the sliding pieces 205 and 206 are moved in order to increase the total volume of the cavity 300, creating additional empty spaces 302. Air, or any other gas, is then injected through the injection heads 203 to drive the material present in the void 301 into the empty space available, namely towards the empty spaces 302. Since the material in contact with the mould cools upon contact with this mould, it is the material present at the centre of the void 301, that is hotter and therefore more fluid, that is driven towards the empty spaces 302. The distribution chamber 14 is formed in this way. The volume of the empty spaces 302 is of course calculated according to the internal volume of the chamber that is to be obtained. The product which has flowed into the empty spaces 302 forms nuggets M.

Once the material has cooled, the mould is opened by sliding the hollow part 201 with respect to the core 202, and the central portion 204 of the core which constitutes the screw thread of the fixing skirt is unscrewed. Demoulding of the gas injection heads 203 makes it possible to obtain the product outlet orifices 13, the edges of which are thus perfectly defined. Thus, such orifices can easily be closed in a sealed way. The inlet passage 16 into the distribution chamber is obtained either by piercing, or directly at the time of the injection of the air, by injecting air with sufficient pressure from the central injection head 203 situated facing the region in which the passage 16 is formed, that material is removed. This then yields the attachment depicted in FIGS. 1 to 3.

Figure 5:
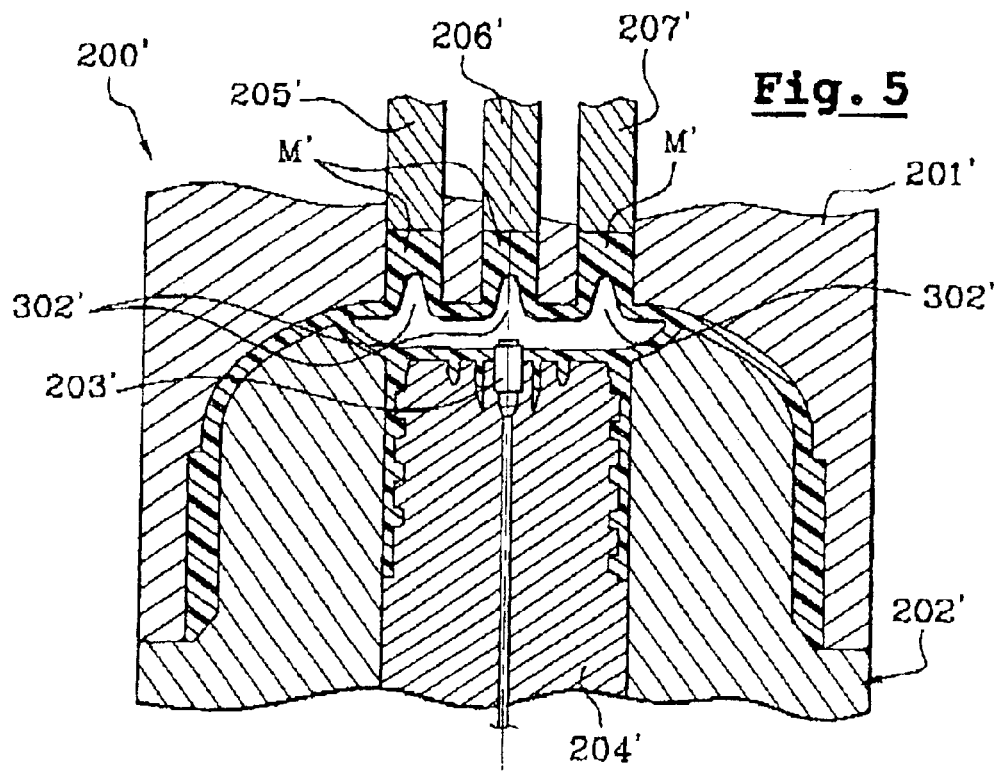
FIG. 5 depicts, prior to release from the mould, the applicator attachment produced according to a second embodiment of a method for manufacturing the applicator attachment according to the invention.

According to an alternative form of the production method, of which the step prior to release from the mould is illustrated in FIG. 5, just one gas injection head 203' is provided. This time, it is arranged along the axis X, in the central portion 204' of the core. Three sliding pieces 205', 206' and 207' are provided this time in the hollow part 201' of the mould. According to this alternative form, demoulding of the injection head makes it possible to obtain the inlet passage 16. Furthermore, nuggets M' are formed, this time on the applicator surface 12. By using such a mould, provision can be made for each sliding piece to yield an empty space 302' big enough for the product flowing into it not to fill it completely but to leave an empty volume within. Thus, the nuggets M' are hollow which means that after release from the mould, they are cut to obtain a smooth applicator surface 12 and product outlet orifices 13.

In the foregoing detailed description, reference was made to some preferred embodiments of the invention. Obviously, variations can be made thereto without departing from the spirit of the invention as claimed hereinafter.

What is claimed is:

1. A product applicator attachment for mounting to a container having an inside for containing a product to be applied, said attachment comprising:
    a fixing means adapted to fix the attachment onto the container; an applicator portion comprising a distribution chamber defined, at least in part, by an applicator surface, said distribution chamber communicating with the inside of the container via an inlet passage having a first axis, said distribution chamber having a longitudinal second axis substantially transverse to said first axis, said distribution chamber further comprising at least one product outlet orifice opening onto the applicator surface, said product outlet orifice having a third axis distinct and substantially parallel to the first axis of the inlet passage, the applicator attachment comprising an integral single piece.

2. An applicator attachment according to claim 1, wherein the applicator surface is domed.

3. An applicator attachment according to claim 1, wherein the fixing means comprises a cylindrical fixing skirt adapted to be fixed onto the container.

4. An applicator attachment according to claim 3, wherein the fixing skirt comprises an interior wall having a screw thread, said screw thread being adapted to collaborate with a second screw thread provided on an exterior wall of the container.

5. An applicator attachment according to claim 1, wherein the inlet passage is surrounded by a sealing skirt adapted to fit into an opening of the container.

6. An applicator attachment according to claim 1, wherein said applicator attachment has an oval cross section having a major longitudinal axis.

7. An applicator attachment according to claims 1, 3 or 6, wherein said applicator attachment comprises at least two outlet orifices.

8. An applicator attachment according to claim 6, wherein said applicator attachment comprises at least two product outlet orifices, said outlet orifices opening onto the applicator surface and disposed along the major axis of the cross section of the attachment.

9. An applicator attachment according to claim 1, wherein said applicator attachment is obtained by moulding a thermoplastic into the integral single piece.

10. An applicator attachment according to claim 9, wherein the thermoplastic is selected from the group consisting of polypropylenes, polyethylenes, polyethylene terephthalates and polystyrenes.

11. A method for producing an applicator attachment for mounting to a container having an inside for containing a product to be applied, said attachment comprising:

a fixing means adapted to fix the attachment onto the container; an applicator portion comprising a distribution chamber defined, at least in part, by an applicator surface, said distribution chamber communicating with the inside of the container via an inlet passage having a first axis, said chamber further comprising at least one product outlet orifice opening onto the applicator surface, said product outlet orifice having a third axis distinct and substantially parallel to the first axis of the inlet passage, said method comprising the following steps:

assembling a mould to delimit a cavity, said mould having at least one moveable part injecting a quantity of thermoplastic into the cavity in order to fill it;

moving the at least one moveable part of the mould in order to increase the volume of the cavity;

injecting a gas into the cavity so that the thermoplastic spreads out in the increased volume of the cavity and so that an internal void is formed within the injected material, thereby forming the distribution chamber; and releasing the applicator attachment from the mould, whereby the applicator is formed as an integral, single piece.

12. A method according to claim 11, wherein the gas is injected via at least one injection head, the process further comprising positioning the injection head in the mould, and, once the gas has been injected and the distribution chamber formed, removing the injection head(s), the injection head(s) positioned in such a way that removal of the injection head upon release of the applicator attachment forms the outlet orifice.

13. A method according to claim 12, wherein the distribution chamber comprises a first wall adjacent to the application surface and a second wall separated from the applicator whereby the moveable part is adapted to delimit, in part, the second wall of the distribution chamber separated from the applicator surface.

14. A method according to claim 11, wherein the gas is injected via an injection head, the process further comprising positioning the injection head in the mould, and, once the gas has been injected and the distribution chamber formed, removing the injection head, the injection head positioned in such a way that the removal of the injection head forms the inlet passage.

15. A method according to claim 14, wherein the distribution chamber comprises a first wall adjacent to the application surface and a second wall separated from the applicator surface, whereby the moveable part is intended to delimit, in part, the first wall of the distribution chamber corresponding to the applicator surface.

16. A product package having a product applicator, comprising:

a container with compressible walls containing a product that is to be applied; and an applicator attachment as in claim 1, mounted on the container.

17. A product package according to claim 16, wherein the container is a tube ending in an open neck onto which the applicator attachment is fixed.

18. A product package according to claims 16 or 17, wherein said product package further comprises a closure cap adapted to close the product outlet orifice(s).

19. A product package according to claim 18, wherein the cap is adapted to fit over said applicator surface and has a wall of a shape roughly complementing the applicator surface of the attachment, said wall having at least one pip adapted to fit into the outlet orifice.

20. A product package according to claim 16, wherein said product is a cosmetic or care product.

21. A product package according to claim 16, wherein said product is a deodorant.

22. A product package according to claim 19, wherein said product is a cosmetic or care product.

23. A product package according to claim 19, wherein said product is a deodorant.

24. A method according to claim 12, wherein said applicator attachment has three outlet orifices, the process comprising positioning three injection heads spaced apart within the mould whereby removal of the injection heads forms the three outlet orifices.

25. An applicator attachment according to claim 1, wherein said distribution chamber further comprises a product outlet orifice opening onto the applicator surface disposed along the first axis of the inlet passage.

26. An applicator attachment made in accordance with the process of claim 11.

* * * * *

UNITED STATES PATENT AND TRADEMARK OFFICE
CERTIFICATE OF CORRECTION

PATENT NO. : 6,939,072 B2
DATED : September 6, 2005
INVENTOR(S) : Laure Thiebaut It is certified that error appears in the above-identified patent and that said Letters Patent is hereby corrected as shown below:

Column 7,
Line 38, after "axis," insert -- said distribution chamber having a longitudinal second axis substantially transverse to said first axis, --.
Line 38, after third occurrence of "said" insert -- distribution --.
Line 45, after "part," insert -- ; --.

Column 8,
Line 8, before "whereby" insert -- surface, --.

Signed and Sealed this

Sixth Day of December, 2005

JON W. DUDAS
*Director of the United States Patent and Trademark Office*